United States Patent [19]
Breidenbach et al.

[11] Patent Number: 6,082,190
[45] Date of Patent: Jul. 4, 2000

[54] ADAPTER FOR FACILITATING THE MEASUREMENT OF THE ANGULAR ORIENTATION OF VEHICLE DRIVE TRAIN COMPONENTS

[75] Inventors: Kevin J. Breidenbach, Perrysburg; Scott B. Robb, Toledo, both of Ohio

[73] Assignee: Dana Corporation, Toledo, Ohio

[21] Appl. No.: 09/119,933

[22] Filed: Jul. 21, 1998

[51] Int. Cl.[7] .................................................. G01M 19/00
[52] U.S. Cl. ............................................. 73/118.2; 33/570
[58] Field of Search ....................... 73/1.75, 487; 33/333, 33/365, 370, 371, 606

[56] References Cited

U.S. PATENT DOCUMENTS

| | | |
|---|---|---|
| 3,438,135 | 4/1969 | Bense . |
| 3,465,449 | 9/1969 | Wideburg et al. . |
| 4,606,133 | 8/1986 | Mills . |
| 4,790,079 | 12/1988 | Meyers ...................................... 33/517 |
| 5,033,292 | 7/1991 | Dennis . |
| 5,513,441 | 5/1996 | Dennis ....................................... 33/370 |

*Primary Examiner*—Max Noori
*Assistant Examiner*—Maurice Stevens
*Attorney, Agent, or Firm*—MacMillan, Sobanski & Todd, LLC

[57] ABSTRACT

An adapter for facilitating the measurement of the angular inclination of components having yokes secured thereto in a vehicular drive train system. The adapter includes a cylindrical shaft portion having an end portion connected to one end thereof. The shaft portion is sized to correspond to the diameter of the opposed bearing cup openings, whether cylindrical as found in a full round end yoke or semi-cylindrical as found in a half round end yoke. The end portion extends perpendicular to the cylindrical shaft and provides a surface upon which an inclinometer may be disposed to measure the relative angular orientation of the yoke. If desired, a slot may be formed in the surface of the shaft portion to accommodate one or more nibs formed on the half round end yoke.

7 Claims, 5 Drawing Sheets

ADAPTER FOR FACILITATING THE MEASUREMENT OF THE ANGULAR ORIENTATION OF VEHICLE DRIVE TRAIN COMPONENTS

BACKGROUND OF THE INVENTION

This invention relates in general to devices for measuring the angular relationships between the various components of a vehicular drive train system. More particularly, this invention relates to an adapter for facilitating the measurement of the angular inclination of components having yokes secured thereto in such a vehicular drive train system.

In most land vehicles in use today, a drive train assembly is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

The relative angular relationships between the axes of rotation of the transmission output shaft, the driveshaft tube, and the axle assembly input shaft are important factors in the proper operation of the drive train system. For example, if the angle defined between the transmission output shaft and the forward end of the driveshaft tube is not approximately equal to the angle defined between the rearward end of the driveshaft tube and the axle assembly input shaft, torsional vibrations may be induced in the vehicle drive train system when rotated during use. Such vibrations can cause undesirable noise and, if not corrected, premature wear and failure of the components of the vehicle drive train system, including the transmission, the universal joints, and the axle assembly.

Accordingly, a number of devices have been developed for facilitating the determination of the relative angular relationships between the various components of the vehicle drive train system. One such device is the Anglemaster® inclinometer sold by Dana Corporation, the assignee of this invention. When disposed in an abutting relationship against a component of the vehicle drive train system, the inclinometer measures the angular inclination of the component relative to the horizontal. The relative angular relationship between any two components in the vehicle drive train system can be determined by individually measuring the angular inclination of each of the components using the inclinometer, then subtracting the two measurements to achieve the relative angular relationship therebetween.

It is usually quite easy to dispose the inclinometer in direct abutting relationship with the driveshaft tube in order to determine the angular inclination thereof. However, it has been found that it is sometimes difficult to move the inclinometer into abutting relationship with the output shaft of the transmission and the input shaft of the axle assembly. Each of these shafts is usually formed having a longitudinally extending splined portion having a yoke secured to one end thereof. Typically, the majority of the longitudinally extending splined portions are disposed within either the transmission or the axle assembly and, therefore, are not readily available for engagement by the inclinometer. Thus, it is known to dispose the inclinometer in abutting relationship with the yokes secured to such shafts in order to measure the respective angular inclinations thereof. In some instances, the yokes are formed having flat machined surfaces that are readily available for engagement by the inclinometer. However, such flat machined surfaces are not always precisely aligned with the rotational axis of the associated shaft, resulting in somewhat inaccurate measurements by the inclinometer. Furthermore, many yokes are not formed having such flat machined surfaces. Thus, it would be desirable to provide an adapter for facilitating the measurement of the angular inclination of such shafts in a vehicular drive train system.

SUMMARY OF THE INVENTION

This invention relates to an adapter for facilitating the measurement of the angular inclination of components having yokes secured thereto in a vehicular drive train system. The adapter includes a cylindrical shaft portion having an end portion connected to one end thereof. The shaft portion is sized to correspond to the diameter of the opposed bearing cup openings, whether cylindrical as found in a full round end yoke or semi-cylindrical as found in a half round end yoke. The end portion extends perpendicular to the cylindrical shaft and provides a surface upon which an inclinometer may be disposed to measure the relative angular orientation of the yoke. If desired, a slot may be formed in the surface of the shaft portion to accommodate one or more nibs formed on the half round end yoke.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
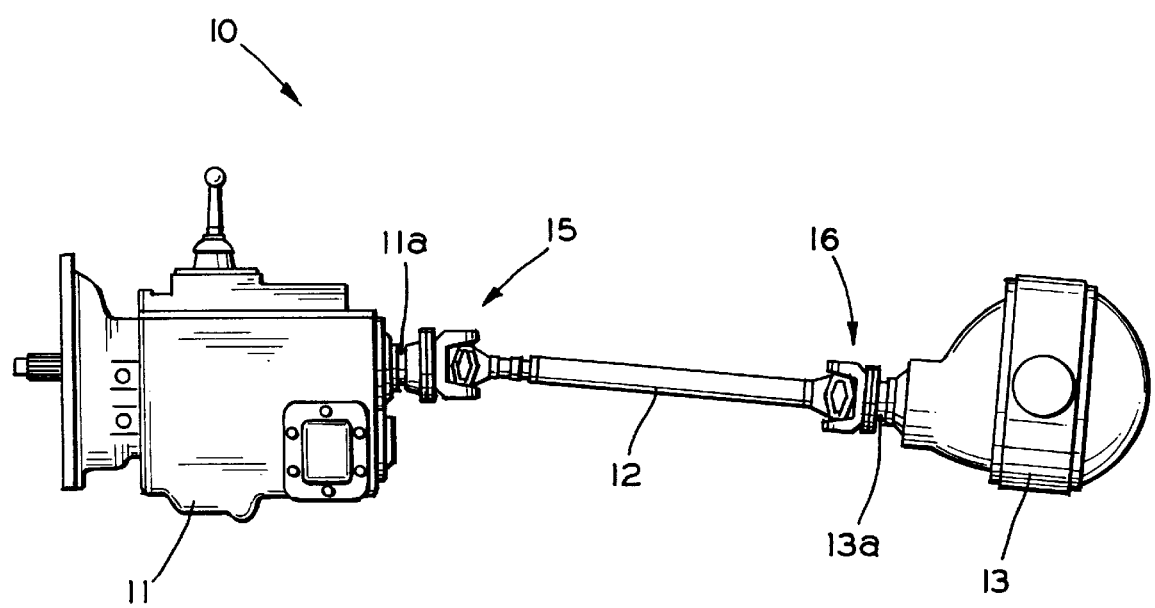
FIG. 1 is a side elevational view of a portion of a conventional vehicular drive train system.

Referring now to the drawings, there is illustrated in FIG. 1 a portion of a conventional vehicular drive train system, indicated generally at 10. The system 10 includes a transmission 11 having an output shaft 11a that is connected through a driveshaft tube 12 to an input shaft 13a of an axle assembly 13. As is typical in such a system 10, the output shaft 11a of the transmission 11 and the input shaft 13a of the axle assembly 13 are not co-axially aligned. To accommodate this, a first universal joint assembly, indicated generally at 15, is connected between the output shaft 11a of the transmission 11 and the forward end of the driveshaft tube 12. Similarly, a second universal joint assembly, indicated generally at 16, is connected between the rearward end of the driveshaft tube 12 and the input shaft 13a of the axle assembly 13. The universal joint assemblies 15 and 16 provide a rotational driving connection from the output shaft 11a of the transmission 11 through the driveshaft tube 12 to the input shaft 13a of the axle assembly 13, while accommodating a limited amount of angular misalignment between the rotational axes of these three shafts 11a, 12, and 13a.

Figure 2:
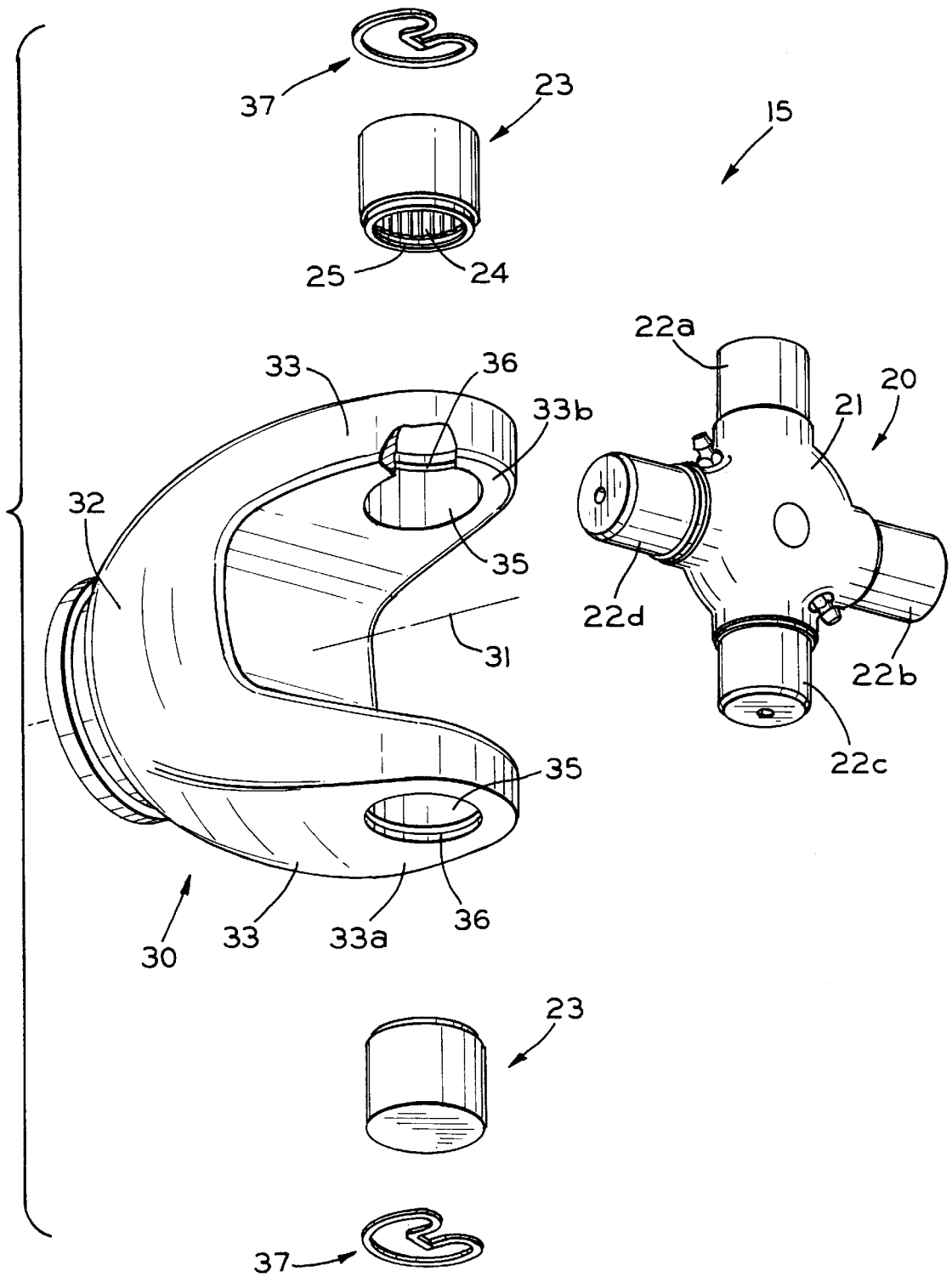
FIG. 2 is an exploded perspective view of a portion of a full round end yoke embodiment for one of the universal joints used in the conventional drive train system illustrated in FIG. 1.

FIG. 2 illustrates the structure of a first embodiment for the universal joint assemblies 15 and 16 used in the conventional drive train system 10 illustrated in FIG. 1. As shown therein, the first embodiment of the universal joint assembly 15 includes a cross member, indicated generally at 20, having a central body 21 and four cylindrical trunnions 22a, 22b, 22c, 22d extending radially outwardly in a common plane at right angles relative to one another. A bearing cup, indicated generally at 23, is mounted on the end of each of the trunnions 22a, 22b, 22c, and 22d (only one opposed pair of the bearing cups 23 is illustrated in FIG. 2). Each of the bearing cups 23 is formed generally in the shape of a hollow cylinder having an outer circumferential surface, an opened end, and a closed end surface. A plurality of needle bearings 24 or other conventional bearing structures are provided between each of the bearing cups 23 and their associated trunnions 22a, 22b, 22c, and 22d to facilitate low friction rotational movement therebetween. A conventional seal and dust guard assembly 25 may, if desired, be installed on each of the bearing cups 23 about the opened ends thereof.

The first embodiment of the universal joint assembly 15 further includes a full round end yoke, indicated generally at 30. The illustrated full round end yoke 30 can be connected to any of the rotatable shafts 11a, 12, or 13a described above in any conventional manner, such as by welding, splines, and the like, so as to rotate about an axis 31. The full round end yoke 30 includes a body portion 32 having a pair of spaced-apart, opposed arms 33 extending therefrom. Each of the opposed arms 33 has an opening 35 formed therethrough which extends from an outer arm surface 33a to an inner arm surface 33b. The openings 35 are preferably cylindrical in shape and are aligned with one another. Typically, the openings 35 define an axis that extends perpendicular to the axis of rotation 31 of the full round end yoke 30. A groove 36 is formed in the inner surface of each of the openings 35. When the cross member 20 is assembled to the full round end yoke 30, the two opposed bearing cups 23 are received within the openings 35 formed through the yoke arms 33. A structure is provided for retaining the bearing cups 23 in the openings 35 formed through the yoke arms 33. In the illustrated embodiment, the retaining structures are a pair of snap rings, each of which is indicated generally at 37. The snap rings 37 cooperate with the grooves 36 in a known manner to retain the bearing cups 23 within the openings 35.

As mentioned above, the relative angular relationships between the axes of rotation of the transmission output shaft 11a, the driveshaft tube 12, and the axle assembly input shaft 13a are important factors in the proper operation of the drive train system 10. For example, if the angle defined between the transmission output shaft 11a and the forward end of the driveshaft tube 12 is not approximately equal to the angle defined between the rearward end of the driveshaft tube 12 and the axle assembly input shaft 13a, torsional vibrations may be induced in the vehicle drive train system 10 when rotated during use. Such vibrations can cause undesirable noise and, if not corrected, premature wear and failure of the components of the vehicle drive train system 10, including the transmission 11, the universal joints 15 and 16, and the axle assembly 13.

Figure 3:
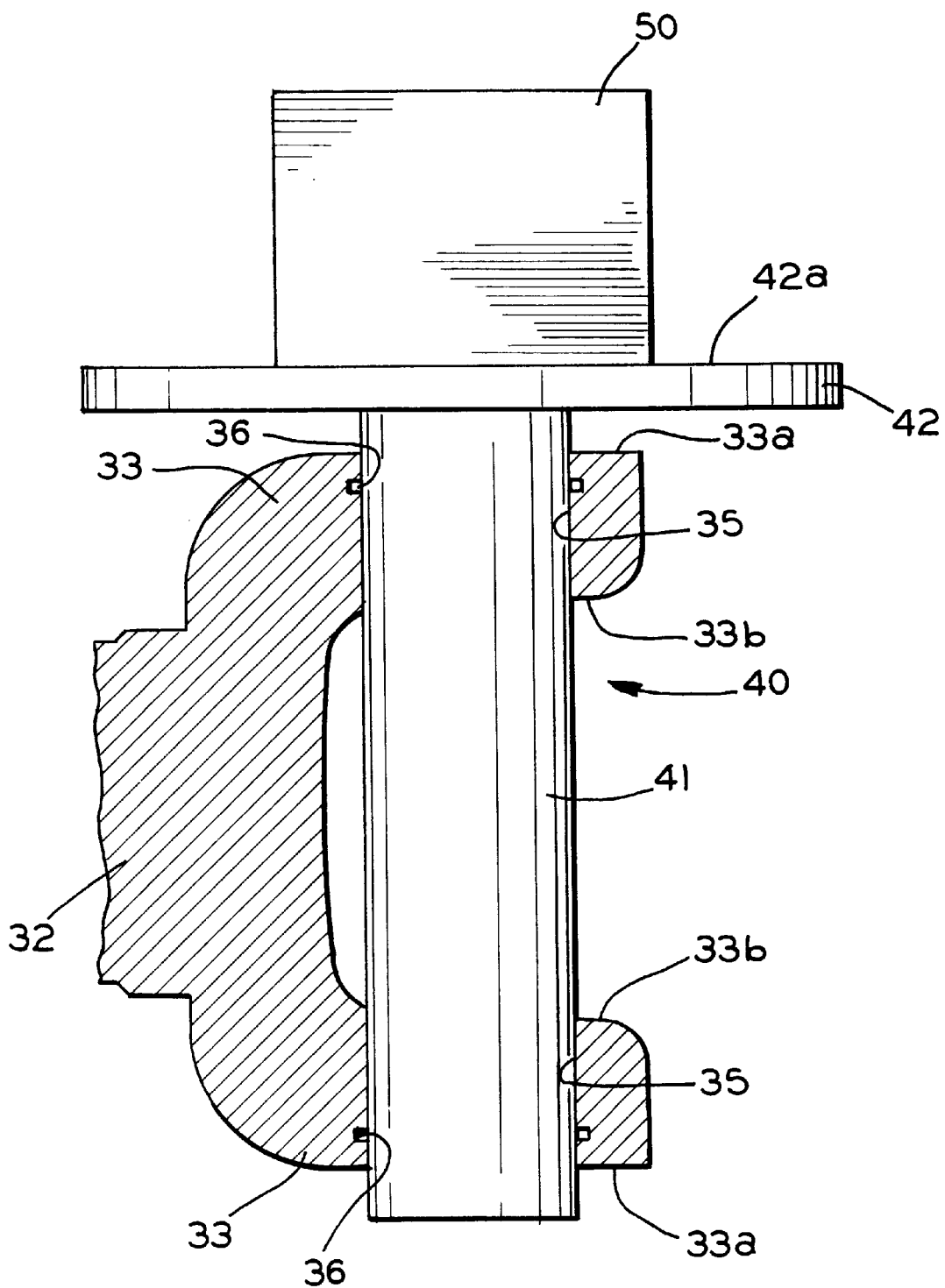
FIG. 3 is a side elevational view, partially in cross section, of the full round end yoke illustrated in FIG. 2 and an adapter in accordance with this invention for facilitating the measurement of the angular inclination of the shaft connected thereto.

Referring now to FIG. 3, there is illustrated an adapter, indicated generally at 40, for facilitating the measurement of the angular inclination of the shaft connected to the full round end yoke 30. As shown therein, the adapter 40 includes a shaft portion 41 and an end portion 42. The shaft portion 41 is preferably formed in the shape of a cylinder defining an outer diameter that is slightly smaller than an inner diameter defined by the openings 35 formed through the arms 33 of the full round end yoke 30. The shaft portion 41 defines a longitudinal axis. The end portion 42 may be formed in any desired shape, such as a circular plate. The end portion 42 has an outer surface 42a, at least a portion of which extends perpendicularly to the longitudinal axis of the shaft portion 41.

To measure the angular inclination of the shaft connected to the full round end yoke 30, the shaft portion 41 of the adapter 40 is initially inserted through the openings 35 formed through the arms 33 of the full round end yoke 30 as shown in FIG. 3. Thus, the longitudinal axis of the shaft portion 41 is oriented perpendicularly relative to the axis of rotation 31 of the full round end yoke 30. As mentioned above, the outer surface 42a of the end portion 42 of the adapter 40 is oriented perpendicularly relative to the longitudinal axis of the shaft portion 41. Thus, the outer surface 42a of the end portion 42 of the adapter 40 defines a plane that extends parallel to the axis of rotation 31 of the full round end yoke 30. The inner surface of the end portion 42 of the adapter 40 may be spaced apart from the outer arm surface 33a of the arm 33 of the full round end yoke 30 as shown, or may alternatively be moved into engagement therewith.

Then, an inclinometer 50 or other conventional measuring device is disposed in abutment with the outer surface 42a of the end portion 42 of the adapter 40. The inclinometer 50 is intended to be representative of any device that is capable of measuring a characteristic of the full round end yoke 30 or the shaft 11a, 12, or 13 connected thereto. If desired, the inclinometer 50 may be temporarily or permanently secured to the end portion 42 in any conventional manner to simplify the process. Preferably, the inclinometer 50 is initially oriented on the outer surface 42a of the end portion 42 so as to extend generally perpendicular to the axis of rotation 31 of the full round end yoke 30. Then, the full round end yoke 30 (and the shaft 11a, 12, or 13 secured thereto) is rotated until the inclinometer 50 indicates that is level with the horizontal. This step in the process, while optional, is usually desirable to prevent the inclinometer 50 from measuring the angular inclination of the full round end yoke 30 as a complex angle in both the horizontal and vertical planes. Rather, the horizontal component of the measured angle will be reduced to zero. However, it may be desirable to measure such complex angles in some instances, such as when there is a relatively large lateral offset between the rotational axes of the output shaft 11a of the transmission 11 and the input shaft 13a of the axle assembly 13. Lastly, while maintaining the full round end yoke 42 in this rotational position, the inclinometer 50 is moved on the outer surface 42a of the end portion 42 of the adapter 40 so as to extend generally parallel to the axis of rotation 31 of the full round end yoke 40. In this position, the inclinometer 50 can measure the angular inclination of the full round end yoke 30.

Figure 4:
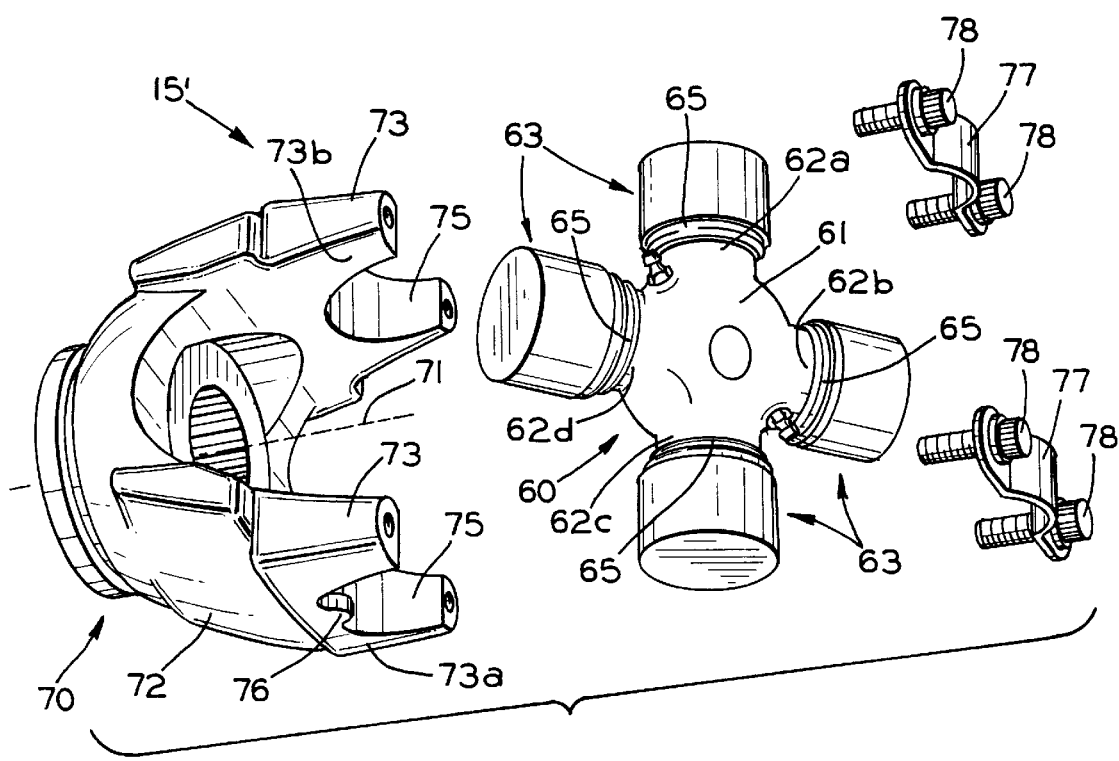
FIG. 4 is an exploded perspective view of a portion of a half round end yoke embodiment for one of the universal joints used in the conventional drive train system illustrated in FIG. 1.

FIG. 4 illustrates the structure of a second embodiment for the universal joint assemblies 15 and 16 used in the conventional drive train system 10 illustrated in FIG. 1. As shown therein, the second embodiment of the universal joint assembly 15' includes a cross member, indicated generally at 60, having a central body 61 and four cylindrical trunnions 62a, 62b, 62c, 62d extending radially outwardly in a common plane at right angles relative to one another. A bearing cup, indicated generally at 63, is mounted on the end of each of the trunnions 62a, 62b, 62c, and 62d. Each of the bearing cups 63 is formed generally in the shape of a hollow cylinder having an outer circumferential surface, an opened end, and a closed end surface. A plurality of needle bearings (not shown) or other conventional bearing structures are provided between each of the bearing cups 63 and their associated trunnions 62a, 62b, 62c, and 62d to facilitate low friction rotational movement therebetween. A conventional seal and dust guard assembly 65 may, if desired, be installed on each of the bearing cups 63 about the opened ends thereof.

The second embodiment of the universal joint assembly 15' further includes a half round end yoke, indicated generally at 70. The illustrated half round end yoke 70 can be connected to any of the rotatable shafts 11a, 12, or 13a described above in any conventional manner, such as by welding, splines, and the like, so as to rotate about an axis 71. The half round end yoke 70 includes a body portion 72 having a pair of spaced-apart, opposed arms 73 extending therefrom. Each of the opposed arms 73 has an opening 75 formed therethrough which extends from an outer arm surface 73a to an inner arm surface 73b. The openings 75 are preferably semi-cylindrical in shape and are aligned with one another. Typically, the openings 75 define an axis that extends perpendicular to the axis of rotation 71 of the half round end yoke 70. When the cross member 60 is assembled to the half round end yoke 70, two opposed bearing cups 63 are received within the openings 75 formed through the yoke arms 73. A nib 76 is provided on each of the yoke arms 73 that extends partially within each of the openings 75. The nibs 76 are conventional in the art and are provided to retain the bearing cups 63 and the remainder of the universal joint assembly 60 within the half round end yoke 70. Additionally, a structure is provided for retaining the bearing cups 63 in the openings 75 formed through the yoke arms 73. In the illustrated embodiment, the retaining structures are a pair of retaining straps, each of which is illustrated at 77. The retaining straps 77 are connected to the yoke arms 73 by threaded fasteners 78 in a known manner to retain the bearing cups 63 within the openings 75.

Figure 5:
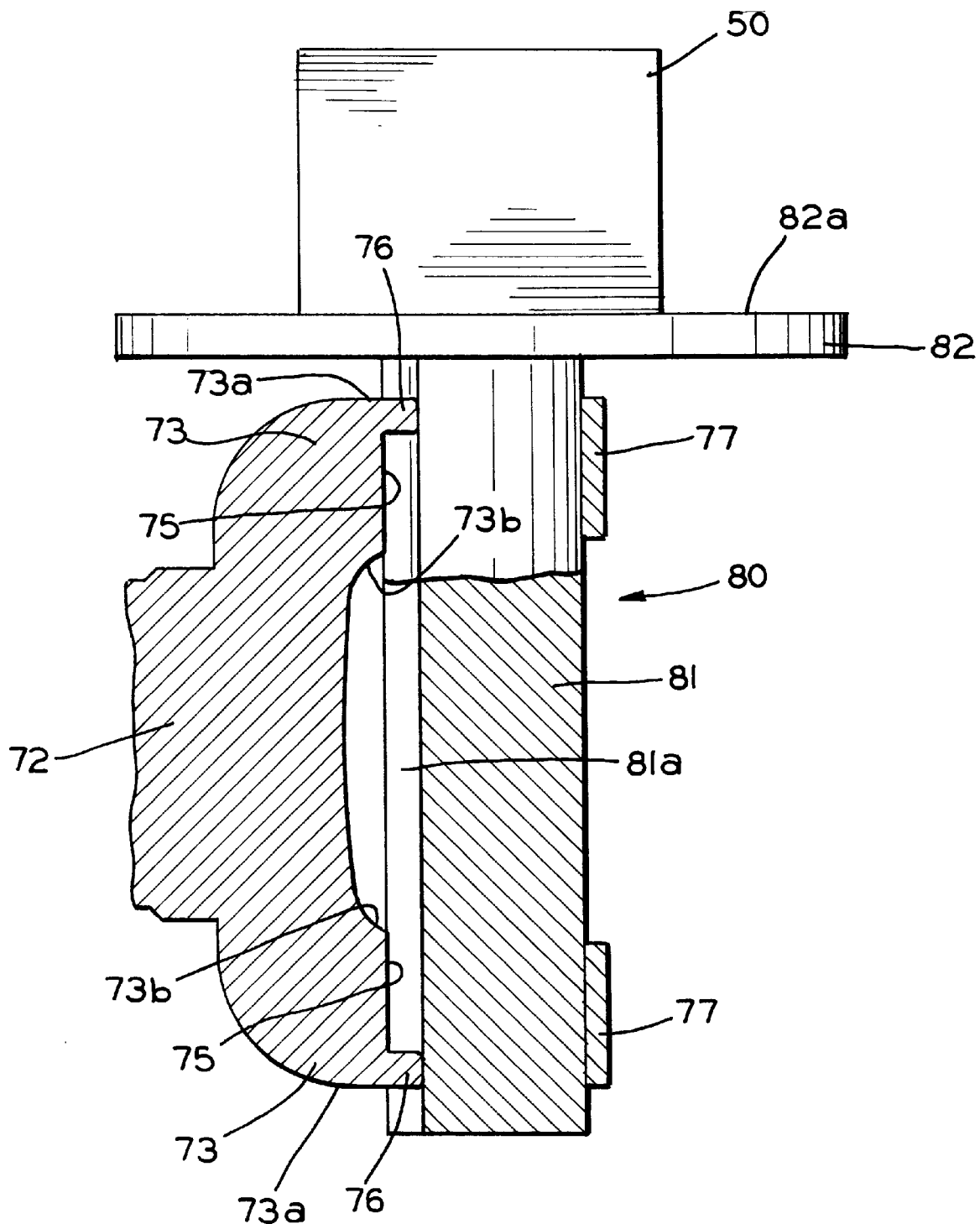
FIG. 5 is a side elevational view, partially in cross section, of the half round end yoke illustrated in FIG. 4 and an adapter in accordance with this invention for facilitating the measurement of the angular inclination of the shaft connected thereto.

Referring now to FIG. 5, there is illustrated an adapter, indicated generally at 80, for facilitating the measurement of the angular inclination of the shaft connected to the half round end yoke 70. As shown therein, the adapter 80 includes a shaft portion 81 and an end portion 82. The shaft portion 81 is preferably formed in the shape of a cylinder defining an outer diameter that is slightly smaller than an inner diameter defined by the openings 75 formed through the arms 73 of the half round end yoke 70. The shaft portion 81 defines a longitudinal axis. A longitudinally extending groove or recess 81a is formed throughout a portion or all of the outer surface of the shaft portion 81. The groove 81a is provided to accommodate the nibs 76 provided on the half round end yoke 70. The end portion 82 may be formed in any desired shape, such as a circular plate. The end portion 82 has an outer surface 82a, at least a portion of which extends perpendicularly to the longitudinal axis of the shaft portion 81.

To measure the angular inclination of the shaft connected to the half round end yoke 70, the shaft portion 81 of the adapter 80 is initially inserted through and into abutment with the openings 75 formed through the arms 73 of the half round end yoke 70 as shown in FIG. 5. Thus, the longitudinal axis of the shaft portion 81 is oriented perpendicularly relative to the axis of rotation 71 of the half round end yoke 70. As mentioned above, the outer surface 82a of the end portion 82 of the adapter 80 is oriented perpendicularly relative to the longitudinal axis of the shaft portion 81. Thus, the outer surface 82a of the end portion 82 of the adapter 80 defines a plane that extends parallel to the axis of rotation 71 of the half round end yoke 70. The inner surface of the end portion 82 of the adapter 80 may be spaced apart from the outer arm surface 73a of the arm 73 of the half round end yoke 70 as shown, or may alternatively be moved into engagement therewith. Then, an inclinometer 50 or other conventional measuring device is disposed in abutment with the outer surface 82a of the end portion 82 of the adapter 80. The inclinometer 50 can be used in the same manner as described above to measure the angular inclination of the full round end yoke 30.

In accordance with the provisions of the patent statutes, the principle and mode of operation of the present invention have been explained and illustrated in the preferred embodiment, however, it will be understood that the present invention may be practiced otherwise than as specifically explained and illustrated without departing from its spirit or scope.

What is claimed is:

1. A method of measuring the angular inclination of a vehicle drive train component including a yoke having an opening formed therethrough, said method comprising the steps of:

(a) providing an adapter having a shaft portion and an end portion;

(b) inserting the shaft portion of the adapter through the opening of the yoke;

(c) supporting an inclinometer on the end portion of the adapter; and (d) measuring the angular inclination of the vehicle drive train component using the inclinometer.

2. The method defined in claim 1 wherein said step (a) is performed by forming the shaft portion of the adapter to be approximately equal in size to the size of the opening.

3. The method defined in claim 1 wherein said step (a) is performed by forming the end portion of the adapter to extend generally perpendicular to the shaft portion.

4. The method defined in claim 1 wherein the yoke is formed having a pair of arms having respective openings formed therethrough, and wherein said step (a) is performed by providing the adapter with a shaft portion that is approximately equal in size to the size of each of the openings.

5. The method defined in claim 1 wherein the yoke is formed having a pair of arms having respective openings formed therethrough, and wherein said step (b) is performed by inserting the shaft portion of the adapter through each of the openings of the arms of the yoke.

6. The method defined in claim 1 wherein said step (c) is performed by disposing the inclinometer in abutting relationship with the end portion of the adapter.

7. The method defined in claim 1 wherein said step (d) is performed by orienting the inclinometer perpendicular to the axis of rotation of the vehicle drive train component, rotating the vehicle drive train component such that the opening is oriented vertically, orienting the inclinometer parallel to the axis of rotation of the vehicle drive train component, and measuring the angular inclination of the vehicle drive train component using the inclinometer.

* * * * *